US012152173B2

(12) United States Patent
Yu et al.

(10) Patent No.: US 12,152,173 B2
(45) Date of Patent: Nov. 26, 2024

(54) COMPOSITE POLYESTER HOT-MELT ADHESIVE AND PREPARATION METHOD THEREOF AND PREPARATION METHOD OF ANTI-SCOURING GEOTEXTILE

(71) Applicant: China Institute of Water Resources and Hydropower Research, Beijing (CN)

(72) Inventors: Shu Yu, Beijing (CN); Zuyu Chen, Beijing (CN); Laizhang Zhang, Beijing (CN); Wenxin Yang, Beijing (CN); Yanfeng Wen, Beijing (CN); Zhanbin Li, Beijing (CN); Wei Cao, Beijing (CN); Maosheng Zhang, Beijing (CN); Fan Yue, Beijing (CN); Yanlong Li, Beijing (CN); Peng Li, Beijing (CN); Zheng Si, Beijing (CN); Wugang Gao, Beijing (CN); Pengyi Liu, Beijing (CN); Weiqin Dang, Beijing (CN); Zongjun Han, Beijing (CN); Jiawei Zhou, Beijing (CN); Qiang Xue, Beijing (CN); Qiang Zhang, Beijing (CN); Aiping Wang, Beijing (CN); Yumei Guo, Beijing (CN); Xiaowei Liang, Beijing (CN); Xueying Liu, Beijing (CN)

(73) Assignee: China Institute of Water Resources and Hydropower Research, Beijing (CN)

( * ) Notice: Subject to any disclaimer, the term of this patent is extended or adjusted under 35 U.S.C. 154(b) by 889 days.

(21) Appl. No.: 17/258,163

(22) PCT Filed: Jul. 4, 2020

(86) PCT No.: PCT/CN2020/100296
§ 371 (c)(1),
(2) Date: Jan. 6, 2021

(87) PCT Pub. No.: WO2021/004410
PCT Pub. Date: Jan. 14, 2021

(65) Prior Publication Data
US 2022/0348804 A1    Nov. 3, 2022

(30) Foreign Application Priority Data
Jul. 8, 2019   (CN) .......................... 201910611143.9

(51) Int. Cl.
| C09J 167/03 | (2006.01) |
| C09J 7/10 | (2018.01) |
| C09J 7/25 | (2018.01) |
| C09J 11/06 | (2006.01) |
| C09J 11/08 | (2006.01) |

(52) U.S. Cl.
CPC ............... *C09J 167/03* (2013.01); *C09J 7/10* (2018.01); *C09J 7/25* (2018.01); *C09J 11/06* (2013.01); *C09J 11/08* (2013.01); *C09J 2301/304* (2020.08); *C09J 2301/408* (2020.08); *C09J 2301/412* (2020.08)

(58) Field of Classification Search
CPC ..... C09J 167/03; C09J 7/25; C09J 7/10; C09J 11/06; C09J 11/08; C09J 2301/408; C09J 2301/412; C09J 2301/304
USPC ......................................................... 524/599
See application file for complete search history.

(56) References Cited

U.S. PATENT DOCUMENTS

| 4,252,940 A | 2/1981 | Sublett | |
| 4,328,278 A | 5/1982 | Sublett | |
| 2011/0221658 A1* | 9/2011 | Haddick | ............... G06F 1/1673 |
| | | | 345/8 |

FOREIGN PATENT DOCUMENTS

| CN | 1190411 A | 8/1998 |
| CN | 101525429 A | 9/2009 |
| CN | 102015824 A | 4/2011 |

(Continued)

OTHER PUBLICATIONS

Patrick A. J. M. De Jongh, et al., Thermal study on polyester networks based on the renewable monomers citric acid and gluconolactone. Polymer International, 2017, pp. 59-63, 66(1).

Jinjie Yin, et al., The application and the latest research advancement of polyester hot-melt adhesives, China Adhesives, 2003, pp. 47-50, vol. 12 No.2.

(Continued)

*Primary Examiner* — Ling Siu Choi
*Assistant Examiner* — Ronald Grinsted
(74) *Attorney, Agent, or Firm* — Bayramoglu Law Offices LLC

(57) ABSTRACT

A composite polyester hot-melt adhesive, a preparation method thereof and a preparation method of an anti-scouring geotextile are provided. The preparation method of the composite polyester hot-melt adhesive includes the following steps: performing an esterification reaction on a dibasic acid and a dihydric alcohol under a protection of nitrogen and an action of a titanium/cobalt composite catalyst, adding a stabilizer for a polycondensation reaction to obtain a polyester hot-melt adhesive, then adding polymethyl methacrylate (PMMA) microspheres for mixing and stirring to obtain the composite polyester hot-melt adhesive. The anti-scouring geotextile is obtained by bonding a polyethylene terephthalate woven fabric with a polypropylene geotextile by the composite polyester hot-melt adhesive. The composite polyester hot-melt adhesive has the advantages of high bonding strength and good anti-impact performance, and the prepared anti-scouring geotextile has the advantages of high anti-scouring strength, good soil conservation performance, strong protection capability and long service life.

11 Claims, No Drawings

(56) References Cited

FOREIGN PATENT DOCUMENTS

| CN | 102936473 A | | 2/2013 |
|---|---|---|---|
| CN | 103146164 A | * | 6/2013 |
| CN | 103289065 A | * | 9/2013 |
| CN | 104109499 A | | 10/2014 |
| CN | 108624272 A | | 10/2018 |
| CN | 110317563 A | | 10/2019 |
| EP | 0679670 A1 | * | 11/1995 |

OTHER PUBLICATIONS

Chief Editor: Xiangzhi Ma, Four, Polymethylmethacrylate (PMMA), Organic Chemistry, 2004, China Medical Science Press.

* cited by examiner

COMPOSITE POLYESTER HOT-MELT ADHESIVE AND PREPARATION METHOD THEREOF AND PREPARATION METHOD OF ANTI-SCOURING GEOTEXTILE

CROSS REFERENCE TO THE RELATED APPLICATIONS

This application is the national phase entry of International Application No. PCT/CN2020/100296, filed on Jul. 4, 2020, which is based upon and claims priority to Chinese Patent Application No. 201910611143.9, filed on Jul. 8, 2019, the entire contents of which are incorporated herein by reference.

TECHNICAL FIELD

The present invention relates to the technical field of preparation of polyester hot-melt adhesive, and in particular, to a composite polyester hot-melt adhesive and a preparation method thereof and a preparation method of an anti-scouring geotextile.

BACKGROUND

Because of their physical and chemical properties, such as lightweight, flexibility, significant strength and integrity and they are non-perishable, geotextiles have numerous applications. Geotextiles are used in a variety of engineering fields like water conservancy, water transportation, highways and buildings for things like reverse filtration, drainage, isolation, reinforcement and seepage prevention.

Polyester hot-melt adhesives are often used in the bonding process of geotextiles. The preparation method mainly includes a direct esterification polycondensation method and a transesterification polycondensation method. The synthesis process using the transesterification polycondensation method generates low-molecular-weight toxic substances that may pollute the environment, so that the transesterification polycondensation method is sometimes limited during application. The existing polyester hot-melt adhesives obtained by the direct esterification polycondensation method, however, generally have the problems of low bonding strength, low curing speed and poor anti-scouring performance.

Additionally, the geotextiles used in water conservancy projects in China currently have the problems of low anti-scouring strength, poor soil conservation performance, poor protection capability and short service life, which cannot meet the high requirements imposed on geotextiles.

SUMMARY

The objective of the present invention is to provide a composite polyester hot-melt adhesive and a preparation method thereof and a preparation method of an anti-scouring geotextile, so as to solve the problems of low bonding strength, low curing speed and poor anti-scouring performance presented in the existing polyester hot-melt adhesives, as well as the problems of low anti-scouring strength, poor soil conservation performance, poor protection capability and short service life existing in geotextiles.

The technical solution of the present invention to solve the above-mentioned technical problems is as follows.

A preparation method of a composite polyester hot-melt adhesive, including the following steps:

(1) performing an esterification reaction on a dibasic acid and a dihydric alcohol under a protection of nitrogen and an action of a titanium/cobalt composite catalyst, wherein a temperature of the reaction is 180° C.-200° C., terminating the esterification reaction when distillate water of the esterification reaction is 95%-98% of a theoretical water yield to obtain an esterification product;

wherein a mass ratio of the dibasic acid and the dihydric alcohol is 1:(1.2-1.5);

the dibasic acid is a mixture of terephthalic acid, isophthalic acid and 2-phenyl glutaric acid with a molar ratio of 1:(0.10-0.30):(0.10-0.30);

the dihydric alcohol is a mixture of diethylene hexanediol, diethylene glycol and 1,4-butanediol with a molar ratio of (1.0-1.2):(0.5-0.7):(0.2-0.4);

(2) after holding for 30-50 min, adding a stabilizer to the esterification product, continuously raising the temperature of the reaction to 230° C.-240° C., reducing a pressure to 80 Pa-100 Pa to conduct a polycondensation reaction for 1.5-3.0 h to obtain a polyester hot-melt adhesive; and (3) adding polymethyl methacrylate (PMMA) microspheres into the polyester hot-melt adhesive under normal pressure and the protection of nitrogen, and mixing and stirring for 1-1.5 h at a temperature of 230° C.-240° C. to obtain the composite polyester hot-melt adhesive.

Further, in a preferred embodiment of the present invention, the titanium/cobalt composite catalyst in step (1) is compounded by a cobalt catalyst and a titanium catalyst. The cobalt catalyst is cobalt acetate, and the titanium catalyst includes tetrabutyl titanate, tetraisopropyl titanate or tetramethyl titanate. An addition amount of the titanium/cobalt composite catalyst is 0.01%-0.03% of a total mass of the dibasic acid. The titanium catalyst accounts for 65-75 wt % of the titanium/cobalt composite catalyst with the remaining of cobalt catalyst.

Further, in a preferred embodiment of the present invention, the stabilizer in step (2) is triphenyl phosphite or trimethyl phosphate.

Further, in a preferred embodiment of the present invention, an addition amount of the PMMA microspheres in step (3) is 0.5 wt %-1 wt % of the polyester hot-melt adhesive.

Further, in a preferred embodiment of the present invention, gluconolactone is also added into the polyester hot-melt adhesive in step (3).

Further, in a preferred embodiment of the present invention, an addition amount of the gluconolactone is 0.1 wt %-0.3 wt % of the polyester hot-melt adhesive.

Further, in a preferred embodiment of the present invention, a particle size of the PMMA microspheres is 5 μm-10 μm.

A composite polyester hot-melt adhesive is prepared by the above-mentioned preparation method of the composite polyester hot-melt adhesive.

A preparation method of an anti-scouring geotextile adopting the composite polyester hot-melt adhesive, including the following steps:

melting and mixing the composite polyester hot-melt adhesive with water, spraying onto a polyethylene terephthalate woven fabric, standing for 1-3 min, and pressing with a polypropylene geotextile under a pressure of 50-300 Kgf for 1-5 min.

Further, in a preferred embodiment of the present invention, a mass ratio of the composite polyester hot-melt adhesive and the water is 3-4:1.

The present invention has the following advantages.
1. The present invention adopts the 2-phenyl glutaric acid and the diethylene hexanediol with a straight-chain structure to modify the polyester hot-melt adhesive, which can effectively improve the bonding strength of the polyester hot-melt adhesive, reduce the rigidity of the polyester polymer chain, improve its compliance, so as to reduce its glass transition temperature and improve its curing speed.
2. The present invention adopts the PMMA microspheres, which has the advantages of high strength and good anti-impact performance. The anti-impact performance of the composite polyester hot-melt adhesive obtained by blending the PMMA microspheres with the polyester hot-melt adhesive can be obviously improved. In addition, as an organic modification additive, the PMMA microspheres can enhance the bonding strength of the composite polyester hot-melt adhesive through the synergistic effect with the polyester hot-melt adhesive.
3. The present invention adopts the titanium/cobalt composite catalyst compounded by a cobalt catalyst and a titanium catalyst, the titanium catalyst is used as a main catalyst to accelerate the esterification reaction process, and the cobalt catalyst is used as an auxiliary catalyst to prevent polyester from decomposition to generate other substances that may reduce catalytic activity of the main catalyst.
4. In the composite polyester hot-melt adhesive of the present invention, the gluconolactone is further added as an accelerant to promote the blending process of the PMMA microspheres and the polyester hot-melt adhesive, and improve the bonding strength and curing speed of the composite polyester hot-melt adhesive.
5. The present invention adopts the polyethylene terephthalate woven fabric and the polypropylene geotextile, which have the advantages of high-temperature resistance, non-water absorption, anti-impact performance and non-toxic. The polyethylene terephthalate woven fabric and the polypropylene geotextile are bound by the composite polyester hot-melt adhesive to obtain the anti-scouring geotextile with high anti-scouring strength, good soil conservation performance, strong protection capability and long service life.

DETAILED DESCRIPTION OF THE EMBODIMENTS

The principles and features of the present invention are described below in combination with embodiments. The embodiments listed herein are only used to illustrate the present invention, not to limit the scope of the present invention. If the specific conditions are not specified in the embodiments, the conventional conditions or the conditions recommended by the manufacturer shall be followed. The reagents or instruments used are conventional products which are commercially available without reference to the manufacturer.

Embodiment 1

A preparation method of a composite polyester hot-melt adhesive in embodiment 1 includes the following steps.
(1) An esterification reaction is performed on a dibasic acid and a dihydric alcohol under a protection of nitrogen and an action of a titanium/cobalt composite catalyst. A temperature of the reaction is 180° C. The esterification reaction is terminated when distillate water of the esterification reaction is 95% of a theoretical water yield to obtain an esterification product.

A mass ratio of the dibasic acid and the dihydric alcohol is 1:1.2.

The dibasic acid is a mixture of terephthalic acid, isophthalic acid and 2-phenyl glutaric acid with a molar ratio of 1:0.10:0.10.

The dihydric alcohol is a mixture of diethylene hexanediol, diethylene glycol and 1,4-butanediol with a molar ratio of 1.0:0.5:0.2.

The titanium/cobalt composite catalyst is compounded by a cobalt catalyst and a titanium catalyst, the cobalt catalyst is cobalt acetate, and the titanium catalyst includes tetrabutyl titanate, tetraisopropyl titanate or tetramethyl titanate. An addition amount of the titanium/cobalt composite catalyst is 0.01% of a total mass of the dibasic acid. The titanium catalyst accounts for 65 wt % of the titanium/cobalt composite catalyst with the remaining of cobalt catalyst.

(2) After holding for 30 min, a stabilizer is added to the esterification product, and the temperature of the reaction is continuously raised to 230° C. A pressure is reduced to 80 Pa to conduct a polycondensation reaction for 1.5 h to obtain a polyester hot-melt adhesive. The stabilizer is triphenyl phosphite or trimethyl phosphate.

(3) Polymethyl methacrylate (PMMA) microspheres and gluconolactone are concurrently added into the polyester hot-melt adhesive under normal pressure and the protection of nitrogen, and mixed and stirred for 1 h at a temperature of 230° C. to obtain the composite polyester hot-melt adhesive. An addition amount of the PMMA microspheres is 0.5 wt % of the polyester hot-melt adhesive, a particle size of the PMMA microspheres is 5 and an addition amount of the gluconolactone is 0.1 wt % of the polyester hot-melt adhesive.

Embodiment 2

A preparation method of a composite polyester hot-melt adhesive in embodiment 2 includes the following steps.
(1) An esterification reaction is performed on a dibasic acid and a dihydric alcohol under a protection of nitrogen and an action of a titanium/cobalt composite catalyst. A temperature of the reaction is 190° C. The esterification reaction is terminated when distillate water of the esterification reaction is 97% of a theoretical water yield to obtain an esterification product.

A mass ratio of the dibasic acid and the dihydric alcohol is 1:1.4.

The dibasic acid is a mixture of terephthalic acid, isophthalic acid and 2-phenyl glutaric acid with a molar ratio of 1:0.20:0.20.

The dihydric alcohol is a mixture of diethylene hexanediol, diethylene glycol and 1,4-butanediol with a molar ratio of 1.1:0.6:0.3.

The titanium/cobalt composite catalyst is compounded by a cobalt catalyst and a titanium catalyst, the cobalt catalyst is cobalt acetate, and the titanium catalyst includes tetrabutyl titanate, tetraisopropyl titanate or tetramethyl titanate. An addition amount of the titanium/cobalt composite catalyst is 0.02% of a total mass of the dibasic acid. The titanium catalyst accounts for 70 wt % of the titanium/cobalt composite catalyst with the remaining of cobalt catalyst.

(2) After holding for 40 min, a stabilizer is added to the esterification product, and a temperature of the reaction is continuously raised to 235° C. A pressure is reduced to 90 Pa to conduct a polycondensation reaction for 2 h to obtain a polyester hot-melt adhesive. The stabilizer is triphenyl phosphite or trimethyl phosphate.

(3) Polymethyl methacrylate (PMMA) microspheres and gluconolactone are concurrently added into the polyester hot-melt adhesive under normal pressure and the protection of nitrogen, and mixed and stirred for 1 h at a temperature of 235° C. to obtain the composite polyester hot-melt adhesive. An addition amount of the PMMA microspheres is 0.7 wt % of the polyester hot-melt adhesive, a particle size of the PMMA microspheres is 8 μm, and an addition amount of the gluconolactone is 0.2 wt % of the polyester hot-melt adhesive.

Embodiment 3

A preparation method of a composite polyester hot-melt adhesive in embodiment 3 includes the following steps.

(1) An esterification reaction is performed on a dibasic acid and a dihydric alcohol under a protection of nitrogen and an action of a titanium/cobalt composite catalyst. A temperature of the reaction is 200° C. The esterification reaction is terminated when distillate water of the esterification reaction is 98% of a theoretical water yield to obtain an esterification product.

A mass ratio of the dibasic acid and the dihydric alcohol is 1:1.5.

The dibasic acid is a mixture of terephthalic acid, isophthalic acid and 2-phenyl glutaric acid with a molar ratio of 1:0.30:0.30.

The dihydric alcohol is a mixture of diethylene hexanediol, diethylene glycol and 1,4-butanediol with a molar ratio of 1.2:0.7:0.4.

The titanium/cobalt composite catalyst is compounded by a cobalt catalyst and a titanium catalyst, the cobalt catalyst is cobalt acetate, and the titanium catalyst includes tetrabutyl titanate, tetraisopropyl titanate or tetramethyl titanate. An addition amount of the titanium/cobalt composite catalyst is 0.03% of a total mass of the dibasic acid. The titanium catalyst accounts for 75 wt % of the titanium/cobalt composite catalyst with the remaining of cobalt catalyst.

(2) After holding for 50 min, a stabilizer is added to the esterification product, and the temperature of the reaction is continuously raised to 240° C. A pressure is reduced to 100 Pa to conduct a polycondensation reaction for 3 h to obtain a polyester hot-melt adhesive. The stabilizer is triphenyl phosphite or trimethyl phosphate.

(3) Polymethyl methacrylate (PMMA) microspheres and gluconolactone are concurrently added into the polyester hot-melt adhesive under normal pressure and the protection of nitrogen, and mixed and stirred for 1.5 h at a temperature of 240° C. to obtain the composite polyester hot-melt adhesive. An addition amount of the PMMA microspheres is 0.1 wt % of the polyester hot-melt adhesive, a particle size of the PMMA microspheres is 10 μm, and an addition amount of the gluconolactone is 0.3 wt % of the polyester hot-melt adhesive.

Embodiment 4

A preparation method of an anti-scouring geotextile in embodiment 4 adopts the composite polyester hot-melt adhesive prepared in embodiment 1. The composite polyester hot-melt adhesive and water are melted and mixed at a mass ratio of 3:1, and then sprayed onto a polyethylene terephthalate woven fabric. After standing for 1 min, the sprayed polyethylene terephthalate woven fabric is pressed with a polypropylene geotextile under a pressure of 300 Kgf for 1 min.

Embodiment 5

A preparation method of an anti-scouring geotextile in embodiment 5 adopts the composite polyester hot-melt adhesive prepared in embodiment 2. The composite polyester hot-melt adhesive and water are melted and mixed at a mass ratio of 3.5:1, and then sprayed onto a polyethylene terephthalate woven fabric. After standing for 2 min, the sprayed polyethylene terephthalate woven fabric is pressed with a polypropylene geotextile under a pressure of 150 Kgf for 3 min.

Embodiment 6

A preparation method of an anti-scouring geotextile in embodiment 6 adopts the composite polyester hot-melt adhesive prepared in embodiment 3. The composite polyester hot-melt adhesive and water are melted and mixed at a mass ratio of 4:1, and then sprayed onto a polyethylene terephthalate woven fabric. After standing for 3 min, the sprayed polyethylene terephthalate woven fabric is pressed with a polypropylene geotextile under a pressure of 50 Kgf for 1 min.

Comparative Example 1

A same type of polyester hot-melt adhesive available on the market currently.

Comparative Example 2

The polyester hot-melt adhesive of comparative example 1 is used as an adhesive to be melted and mixed at a mass ratio of 4:1, and then sprayed onto a polyethylene terephthalate woven fabric. After standing for 3 min, it is pressed with a polypropylene geotextile under a pressure of 50 Kgf for 1 min to obtain a composite geotextile.

The composite polyester hot-melt adhesives obtained in embodiments 1-3 and the polyester hot-melt adhesive obtained in comparative example 1 are tested according to the national standards GB/T4608-84, GB/T3682-2000 and the Ministry standards HG/T3716 and FZ/T01085-20000 in China, respectively. The results are shown in Table 1.

TABLE 1

Test Results of Embodiments 1-3 and Comparative Example 1

| | Melting Point | Melt Index | Opening Time | Peel Strength |
|---|---|---|---|---|
| Embodiment 1 | 127° C. | 17.8 g/10 min | 2.7 min | 28.37 N/5 cm |
| Embodiment 2 | 125° C. | 18.0 g/10 min | 2.9 min | 29.83 N/5 cm |
| Embodiment 3 | 128° C. | 18.3 g/10 min | 3.0 min | 26.52 N/5 cm |
| Comparative Example 1 | 135° C. | 20.3 g/10 min | 1.8 min | 20.67 N/5 cm |

Table 1 shows that the melting points of the composite polyester hot-melt adhesives in embodiments 1-3 are slightly lower than the melting point of the same type of polyester hot-melt adhesive on the market, but the melt indexes of the composite polyester hot-melt adhesives in embodiments 1-3 are significantly higher than the melt index of comparative example 1, indicating that the composite polyester hot-melt adhesives in embodiments 1-3 have higher viscosity. Moreover, the opening time and peel strength of the composite polyester hot-melt adhesives are also significantly better than the opening time and peel strength of the polyester hot-melt adhesive in comparative example 1.

The anti-scouring geotextiles prepared in embodiments 4-6 and the composite geotextile prepared in comparative example 2 are cut and sewn into cuboid geotechnical bags with a length of 15 cm, a width of 7.5 cm and a height of 9.5 cm. The cuboid geotechnical bags are each filled with the same amount of loess, and then put into a test pit of a cylindrical scour tester for an anti-scouring test where different water flow rates are employed for 30 min each time. The results are shown in Table 2.

TABLE 2

Anti-scouring Test Results of Embodiments 4-6 and Comparative Example 2

| | | Embodiment 4 | | | Embodiment 5 | | | Embodiment 6 | | | Comparative Example 2 | | |
|---|---|---|---|---|---|---|---|---|---|---|---|---|---|
| | | Scour Rate | | | Scour Rate | | | Scour Rate | | | Scour Rate | | |
| Water Flow Rate (m/s) | Scour Time (min) | Scour Amount Weight (g) | Total Weight Percentage (%) | Scour Rate per Surface Area (g/m$^2 \cdot$s) | Scour Amount Weight (g) | Total Weight Percentage | Scour Rate per Surface Area (g/m$^2 \cdot$s) | Scour Amount Weight (g) | Total Weight Percentage (%) | Scour Rate per Surface Area (g/m$^2 \cdot$s) | Scour Amount Weight (g) | Total Weight Percentage | Scour Rate per Surface Area (g/m$^2 \cdot$s) |
| 0.7 | 30 | 0 | 0.00 | 0.00 | 0 | 0.00 | 0.00 | 0 | 0.00 | 0.00 | 2 | 0.00 | 0.08 |
| 1.05 | 30 | 1 | 0.10 | 0.04 | 1 | 0.10 | 0.04 | 2 | 0.21 | 0.09 | 4 | 0.42 | 0.17 |
| 1.4 | 30 | 6 | 0.63 | 0.26 | 5 | 0.52 | 0.22 | 5 | 0.52 | 0.22 | 9 | 0.87 | 0.29 |
| 1.75 | 30 | 13 | 1.29 | 0.57 | 12 | 1.26 | 0.52 | 15 | 1.57 | 0.65 | 22 | 2.30 | 0.95 |
| 2.1 | 30 | 20 | 2.12 | 0.89 | 22 | 2.30 | 0.95 | 21 | 2.22 | 0.91 | 30 | 3.15 | 1.30 |
| 3.3 | 30 | 45 | 4.7 | 1.96 | 46 | 4.83 | 2.00 | 47 | 4.91 | 2.02 | 50 | 5.25 | 2.17 |

Table 2 shows that the scour rates and scour rates per surface area of the anti-scouring geotextiles prepared in embodiments 4-6 are lower than the scour rate and scour rate per surface area of the composite geotextile prepared in comparative example 2. After the sixth scouring with the water flow speed of 3.3 m/s, i.e., after 180 min of the scouring, the geotechnical bags sewn by the anti-scouring geotextiles in the embodiments 4-6 do not deform, while the geotechnical bag sewn by the comparative example 2 has deformed.

The geotechnical bag sewn by the anti-scouring geotextile prepared in embodiment 5 is subjected to a soft stepped spillway test. The result shows that the geotechnical bag sewn by the anti-scouring geotextile prepared in embodiment 5 can at most resist scouring at the water flow rate of 5 m/s for 600 min, and the soft stepped spillway does not deform after the test is finished.

The above-mentioned is to be considered as preferred embodiments of the present invention and is not intended to limit the present invention. Any modifications, equivalent replacements, improvements, etc. made within the spirit and principles of the present invention shall be included within the protection scope of the present invention.

What is claimed is:

1. A preparation method of a composite polyester hot-melt adhesive, comprising the following steps:
    (1) performing an esterification reaction on a dibasic acid and a dihydric alcohol under a protection of nitrogen and an action of a titanium/cobalt composite catalyst; wherein the titanium/cobalt composite catalyst is a cobalt catalyst and a titanium catalyst, the cobalt catalyst is cobalt acetate, and the titanium catalyst is one selected from the group consisting of tetrabutyl titanate, tetraisopropyl titanate and tetramethyl titanate;
    an addition amount of the titanium/cobalt composite catalyst is 0.01%-0.03% of a total mass of the dibasic acid, the titanium catalyst accounts for 65-75 wt % of the titanium/cobalt composite catalyst, and the cobalt catalyst accounts for 25-35 wt % of the titanium/cobalt composite catalyst;
    the temperature of the esterification reaction is 180° C.-200° C.; terminating the esterification reaction when distillate water of the esterification reaction is 95%-98% of a theoretical water yield of the esterification reaction to obtain an esterification product; and
    wherein, the mass ratio of the dibasic acid and the dihydric alcohol is 1:(1.2-1.5);
    the dibasic acid is a mixture of terephthalic acid, isophthalic acid and 2-phenyl glutaric acid with a molar ratio of 1:(0.10-0.30):(0.10-0.30);
    the dihydric alcohol is a mixture of diethylene hexanediol, diethylene glycol and 1,4-butanediol with a molar ratio of (1.0-1.2):(0.5-0.7):(0.2-0.4);
    (2) after holding for 30 min-50 min, adding a stabilizer to the esterification product to obtain a first mixture, and continuously raising the temperature of the first mixture to 230° C.-240° C.; reducing the pressure to 80 Pa-100 Pa to conduct a polycondensation reaction on the first mixture for 1.5 h-3 h to obtain a polyester hot-melt adhesive;
    (3) adding polymethyl methacrylate (PMMA) microspheres and gluconolactone into the polyester hot-melt adhesive under normal pressure and the protection of nitrogen to obtain a second mixture, and mixing and stirring the second mixture for 1 h-1.5 h at 230° C.-240° C. to obtain the composite polyester hot-melt adhesive, wherein an amount of the gluconolactone is 0.1 wt %-0.3 wt % of the polyester hot-melt adhesive.

2. The preparation method of the composite polyester hot-melt adhesive according to claim 1, wherein, the stabilizer in step (2) is triphenyl phosphite or trimethyl phosphate.

3. The preparation method of the composite polyester hot-melt adhesive according to claim 1, wherein, an addition amount of the PMMA microspheres in step (3) is 0.5 wt %-1 wt % of the polyester hot-melt adhesive.

4. The preparation method of the composite polyester hot-melt adhesive according to claim 1, wherein, the particle size of each PMMA microsphere of the PMMA microspheres is 5 μm-10 μm.

5. A composite polyester hot-melt adhesive prepared by the preparation method of the composite polyester hot-melt adhesive according to claim 1.

6. A preparation method of an anti-scouring geotextile using the composite polyester hot-melt adhesive according to claim 5, comprising the following steps:
melting and mixing the composite polyester hot-melt adhesive with water to obtain a third mixture, spraying the third mixture onto a polyethylene terephthalate woven fabric, standing for 1 min-3 min to obtain a processed polyethylene terephthalate woven fabric, and pressing the processed polyethylene terephthalate woven fabric with a polypropylene geotextile under a pressure of 50 Kgf-300 Kgf for 1 min-5 min.

7. The preparation method of the anti-scouring geotextile according to claim 6, wherein, the mass ratio of the composite polyester hot-melt adhesive and the water is 3-4:1.

8. The preparation method according to claim 2, wherein, the particle size of each PMMA microsphere of the PMMA microspheres is 5 μm-10 μm.

9. The preparation method according to claim 3, wherein, the particle size of each PMMA microsphere of the PMMA microspheres is 5 μm-10 μm.

10. The composite polyester hot-melt adhesive according to claim 5, wherein, the stabilizer in step (2) is triphenyl phosphite or trimethyl phosphate.

11. The composite polyester hot-melt adhesive according to claim 5, wherein, an addition amount of the PMMA microspheres in step (3) is 0.5 wt %-1 wt % of the polyester hot-melt adhesive.

* * * * *